May 29, 1928.
F. H. BUCKINGHAM
INDICATING DEVICE
Filed Oct. 20, 1922
1,671,272
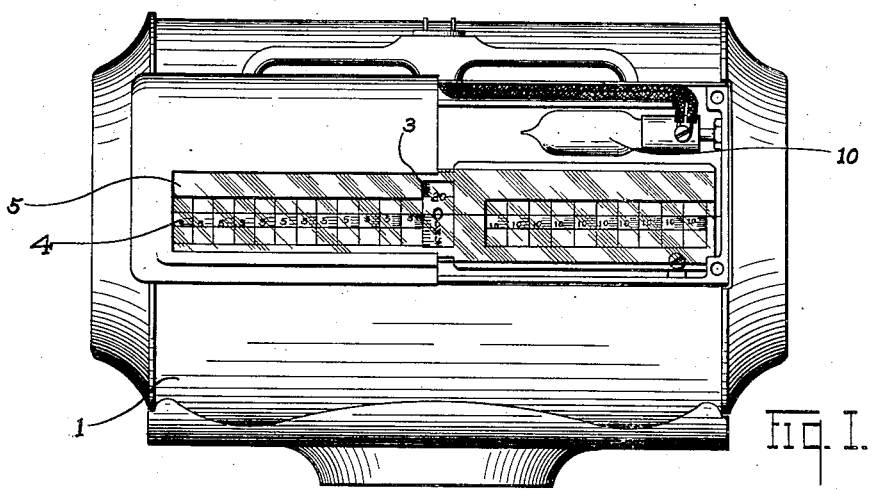
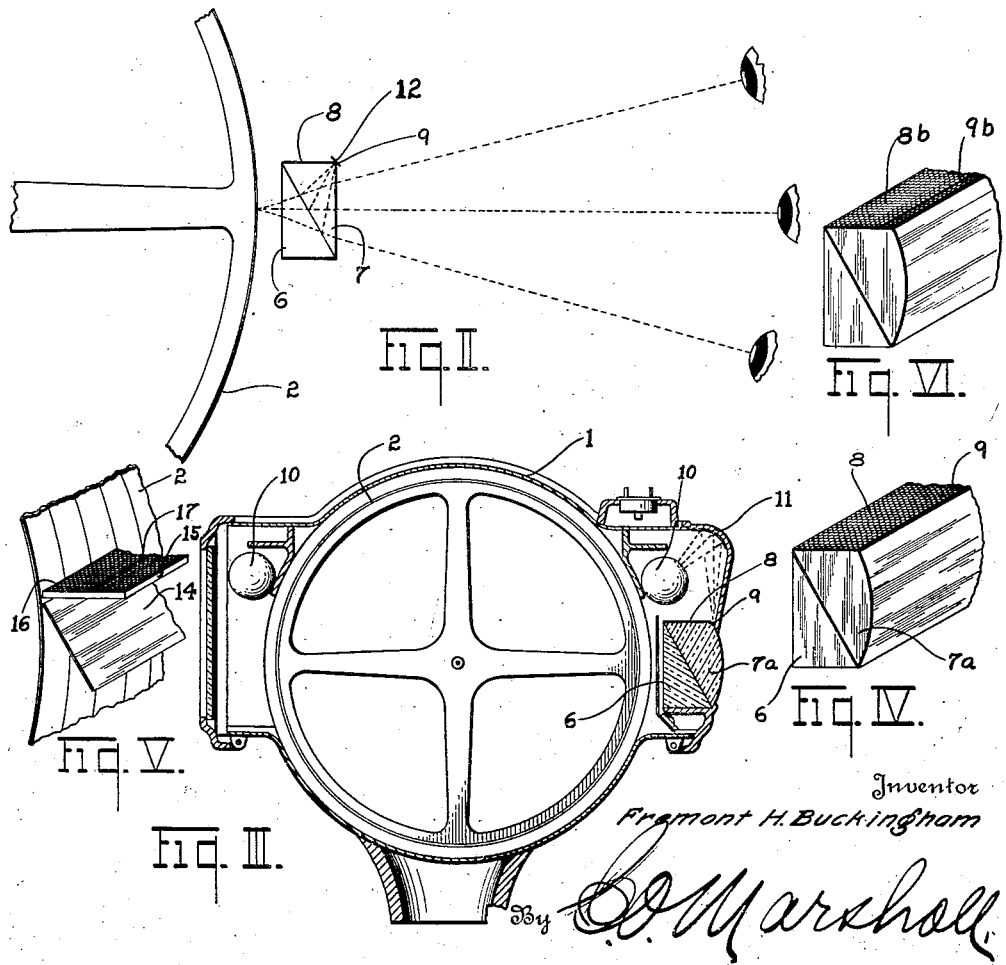
Inventor
Fremont H. Buckingham
By C. C. Marshall
Attorney Patented May 29, 1928.

1,671,272

UNITED STATES PATENT OFFICE.

FREMONT H. BUCKINGHAM, OF DETROIT, MICHIGAN, ASSIGNOR TO TOLEDO SCALE COMPANY, OF TOLEDO, OHIO, A CORPORATION OF NEW JERSEY.

INDICATING DEVICE.

Application filed October 20, 1922. Serial No. 595,800.

This invention relates to indicating devices, and particularly to means for obviating errors of parallax due to the position of the reader.

In weighing scales and other devices having automatic indicating mechanism, the indication is usually read by noting the position of a relatively movable chart and index, and, since the index as a general rule is not in the plane of the chart, the particular figure or graduation of the chart with which the index appears to be in registration varies to some extent with the position of the observer. It is an object of this invention to provide means capable of so registering with chart indications that the apparent indication remains the same regardless of change in the position of the observer.

Other objects and advantages will be apparent from the following description, in which reference is had to the accompanying drawings illustrating preferred embodiments of my invention and wherein similar reference numerals designate similar parts throughout the several views.

In the drawings:—

Figure I is a front elevation of a chart housing of a weighing scale embodying my invention, part of the front plate being removed to show the illuminating device;

Figure II is a diagrammatic view illustrating the mode of operation of my device;

Figure III is a vertical sectional view through the chart housing of a weighing scale embodying my invention in modified form;

Figure IV is an enlarged fragmentary perspective view showing certain elements of my invention;

Figure V is a similar view showing elements of still another form; and

Figure VI is a view similar to Figure IV showing another form of the invention, differing only slightly from that shown in Figure IV.

Referring to the drawings in detail, the chart housing 1 and the chart 2 of the scale are of a type in common use, the chart 2 consisting of a light cylinder having weight graduations and figures 3 and value graduations and figures 4 on its outer cylindrical surface, certain of such figures and graduations being visible through a window 5 which extends across the front of the housing. When a load is placed upon the scale the cylindrical chart 2 revolves to an extent proportional to the weight of the load, so that figures and graduations which represent the weight of the load and its values at various prices per pound are brought into position in which they are visible through the window 5. The height of the window is such, however, that figures and graduations above and below those representing the exact weight and values of the commodity are also visible.

In order to indicate the exact figures and graduations to be read, it has been the practice in devices of this kind to stretch a thin wire or line horizontally across the housing in close proximity to the chart and in such position that when viewed through the window 5 the line appears to be in registration with certain figures and graduations. When this device is employed, however, the figures with which the line appears to be in registration vary with the height of the observer, so that the weight and value graduations which appear to a tall observer to be in registration with the indicator line are not the same as those which appear to a short observer to be in registration with the line.

In order to prevent such discrepancies in reading, I employ a transparent mirror through which one of the indicating elements to be brought into registration is visible, the other element being reflected in the mirror, so that to the observer the two elements appear to be in registration in the same plane.

In the form of device shown in Figures I and II the chart is viewed through a pair of complementary prismatic strips of glass 6 and 7 arranged, as shown in Figure II, so that the refraction of one of the prisms is substantially neutralized by the other and a ray of light emanating from the chart and passing through the prism leaves the surface of the outer prism in a direction substantially parallel to the direction in which it entered the surface of the prism nearest the chart. Graduations and figures on the chart viewed through the prisms 6 and 7 therefore appear to be in the same position as that in which they would appear to be if they were viewed through a plain sheet of glass with parallel faces. The upper face of the prism 7 is covered by an opaque strip 8, and the corner at which the outer and upper surfaces of the prism 7 intersect is preferably ground off to form a very narrow flat surface 9, the width of such surface being so slight that it forms, in effect, a fine line. This narrow surface 9 is not covered by the opaque strip 8.

Mounted above the prisms 6 and 7 within the housing 1 are lamps 10, the front cover 11 of the housing being so arranged that light from the lamps 10 is reflected downwardly through the line-like narrow surface 9. The light which passes through the surface 9 is reflected from the inner side of the rear surface of the prism 7, and the parts are so adjusted and arranged that to an observer standing before the window a virtual image of the narrow line-like surface 9 appears as a brilliant line lying horizontally upon the face of the chart 2. The visibility of this line is enhanced by covering the narrow surface 9 with a transparent colored substance, such as a strip 12 of red celluloid, so that the surface 9 appears to the observer as a brilliant red line lying horizontally on the face of the chart 2. The same effect may, of course, be secured by coating the narrow surface 9 with a film of colored material.

In Figures III and IV the front face of the prism 7ª is shown as convex, so that the prism also performs the function of a lens which magnifies the vertical dimensions of the chart characters that are viewed through it and increases the apparent distance between the chart graduations, thus making the indication easier to read. The member 7ª may perhaps more accurately be called a bar than a prism, since its sides are not all plane. "Prism" is used to convey the idea of transparency, but it is to be understood that transparent bars of various forms are included within the term.

In the form of device shown in Figure V, the transparent mirror consists of a sheet 14 of transparent material having a reflecting surface, such as glass or celluloid. Above the transparent mirror 14 is placed a strip 15 of transparent material preferably colored—for example, red glass or red celluloid—having one of its surfaces coated with opaque material 16 having a straight line 17 cut or scratched through it to permit the passage of light. In this form of the device, when the chart 2 is viewed through the transparent mirror 14, the line 17 appears as a brilliant colored line lying upon the face of the chart 2.

Figure VI shows a form of the device differing from that shown in Figure IV only in that the line 9ᵇ is formed not at the corner of the prism, but by scratching or cutting away the opaque material of the strip 8ᵇ along a straight line parallel to the corner.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. In an indicating device, in combination, relatively movable indicating elements, and a transparent mirror, the parts being so arranged that when one of said elements is view through the mirror an image of the other element appears coincident therewith.

2. In an indicating device, in combination, a relatively movable chart and index, and a transparent mirror, the parts being so arranged that when said chart is viewed through said transparent mirror an image of said index appears upon the face of said chart.

3. In an indicating device, in combination, a movable chart, a stationary indicator line, and a transparent mirror, the parts being so arranged that when said chart is viewed through said mirror an image of said line appears substantially coincident with the face of said chart.

4. In a device of the class described, in combination, a chart, a transparent prism through which said chart is visible, and an index, the parts being so arranged that when said chart is viewed through said prism an image of said index appears by reflection from a surface of said prism to lie substantially coincident with the face of said chart.

5. In an indicating device, in combination, a chart, and a transparent prism through which the face of said chart is visible, said prism having an index thereon, the parts being so arranged that when the said chart is viewed through said prism an image of the index appears by reflection from a surface of said prism to lie substantially coincident with the face of said chart.

6. In an indicating device, in combination, a chart, and a transparent prism through which the face of said chart is visible, said prism having an index thereon, the parts being so arranged that when the said chart is viewed through said prism an image of the index appears by reflection from a surface of said prism to lie substantially coincident with the face of said chart, said index being formed by a distinctive narrow portion of the surface of said prism.

7. In an indicating device, in combination, a chart, and a transparent prism through which the face of said chart is visible, said prism having an index thereon, the parts being so arranged that when the said chart is viewed through said prism an image of the index appears by reflection from a surface of said prism to lie substantially coincident with the face of said chart, said index being formed by a narrow transparent portion of the surface of said prism lying adjacent an opaque portion of the surface of said prism.

8. In an indicating device, in combination, a chart, a transparent prism through which the face of said chart is visible, said prism having an index thereon, the parts being so arranged that when the said chart is viewed through said prism an image of the index appears by reflection from a surface of said prism to lie substantially coincident with the face of said chart, said index being formed by a narrow portion of the surface of said prism, and means for supplying colored light to said narrow portion.

9. In an indicating device, in combination, a chart, and a transparent prism through which the face of said chart is visible, said prism having an index thereon, the parts being so arranged that when the said chart is viewed through said prism an image of the index appears by reflection from a surface of said prism to lie substantially coincident with the face of said chart, one of the surfaces of said prism having a coating of opaque material, and said index being in the form of a slit in the said opaque material.

10. In an indicating device, in combination, a chart, a bar of transparent material through which said chart is visible, said bar having a reflecting surface, and an index, the parts being so arranged that when said chart is viewed through said bar an image of the index appears by reflection from said reflecting surface to lie substantially coincident with the face of said chart.

11. In an indicating device, in combination, a chart, a bar of transparent material through which said chart is visible, said bar having a reflecting surface, and an index, the parts being so arranged that when said chart is viewed through said bar an image of the index appears by reflection from said reflecting surface to lie substantially coincident with the face of said chart, said index being formed by a distinctive narrow portion of the surface of said bar.

12. In an indicating device, in combination, a chart, a bar of transparent material through which said chart is visible, said bar having a reflecting surface, and an index, the parts being so arranged that when said chart is viewed through said bar an image of the index appears by reflection from said reflecting surface to lie substantially coincident with the face of said chart, said index being formed by a narrow transparent portion of the surface of said bar lying adjacent the opaque portion of the surface of said bar.

13. In an indicating device, in combination, a chart, a bar of transparent material through which said chart is visible, said bar having a reflecting surface, an index, the parts being so arranged that when said chart is viewed through said bar an image of the index appears by reflection from said reflecting surface to lie substantially coincident with the face of said chart, said index being formed by a narrow portion of the surface of said bar, and means for supplying colored light to said narrow portion.

14. In an indicating device, in combination, a chart, a bar of transparent material through which said chart is visible, said bar having a reflecting surface, and an index, the parts being so arranged that when said chart is viewed through said bar an image of the index appears by reflection from said reflecting surface to lie substantially coincident with the face of said chart, one of the surfaces of said bar having a coating of opaque material, and said index being in the form of a slit in the said opaque material.

15. In an indicating device, in combination, a chart, a bar of transparent material through which said chart is visible, said bar having a reflecting surface and a curved surface whereby the characters of said chart appear magnified as viewed through said bar, and an index, the parts being so arranged that when said chart is viewed through said bar an image of the index appears by reflection from said reflecting surface to lie substantially coincident with the face of said chart.

16. In an indicating device, in combination, a chart, a bar of transparent material through which said chart is visible, said bar having a reflecting surface and a curved surface whereby the characters of said chart appear magnified as viewed through said bar, an index, the parts being so arranged that when said chart is viewed through said bar an image of the index appears by reflection from said reflecting surface to lie substantially coincident with the face of said chart, said index being formed by a narrow portion of the surface of said bar, and means for supplying colored light to said narrow portion.

17. In an indicating device, in combination, a chart, a bar of transparent material through which said chart is visible, said bar having a reflecting surface and a curved surface whereby the characters of said chart appear magnified as viewed through said bar, and an index, the parts being so arranged that when said chart is viewed through said bar an image of the index appears by reflection from said reflecting surface to lie substantially coincident with the face of said chart, one of the surfaces of said bar having a coating of opaque material, and said index being in the form of a slit in the said opaque material.

18. In an indicating device, in combination, a chart, a pair of complementary transparent prisms through which said chart is visible, and an index, the parts being so arranged that when said chart is viewed through said prisms an image of said index appears by reflection from a face of one of said prisms to lie substantially coincident with said chart.

19. In an indicating device, in combination, a chart, a pair of transparent bars through which said chart is visible, one of said bars having a reflecting surface, an index, the parts being so arranged that when the chart is viewed through said bars the prismatic effect of each bar is neutralized by that of the other, and an image of said index appears by reflection from a surface of one of said bars to lie substantially coincident with the face of said chart.

20. In an indicating device, in combination, a chart, a pair of transparent bars through which said chart is visible, one of said bars having a reflecting surface and a curved surface whereby the characters of said chart as viewed through said bars are magnified, an index, the parts being so arranged that when the chart is viewed through said bars the prismatic effect of each bar is neutralized by that of the other, and an image of said index appears by reflection from a surface of one of said bars to lie substantially coincident with the face of said chart.

21. In an indicating device, in combination, a chart, a pair of transparent bars through which said chart is visible, one of said bars having a reflecting surface and a curved surface whereby the characters of said chart as viewed through said bars are magnified, an index in the form of a narrow transparent surface on one of said bars, the parts being so arranged that when the chart is viewed through said bars the prismatic effect of each bar is neutralized by that of the other, and an image of said index appears by reflection from a surface of one of said bars to lie substantially coincident with the face of said chart.

22. In an indicating device, in combination, a chart, a pair of transparent bars through which said chart is visible, one of said bars having a reflecting surface and a curved surface whereby the characters of said chart as viewed through said bars are magnified, an index in the form of a narrow transparent surface on one of said bars, the parts being so arranged that when the chart is viewed through said bars the prismatic effect of each bar is neutralized by that of the other, and an image of said index appears by reflection from a surface of one of said bars to lie substantially coincident with the face of said chart, and means for supplying colored light to said index.

23. In an indicating device, in combination, a chart, a pair of transparent bars through which said chart is visible, one of said bars having a reflecting surface and a curved surface whereby the characters of said chart as viewed through said bars are magnified, a surface of one of said bars being coated with opaque material, an index in the form of a narrow opening in said opaque material, the parts being so arrange that when the chart is viewed through said bars the prismatic effect of each bar is neutralized by that of the other, and an image of said index appears by reflection from a surface of one of said bars to lie substantially coincident with the face of said chart.

24. In an indicating device, in combination, a chart, a pair of transparent bars through which said chart is visible, one of said bars having a reflecting surface and a curved surface whereby the characters of said chart as viewed through said bars are magnified, a surface of one of said bars being coated with opaque material, an index in the form of a narrow opening in said opaque material, the parts being so arranged that when the chart is viewed through said bars the prismatic effect of each bar is neutralized by that of the other, and an image of said index appears by reflection from a surface of one of said bars to lie substantially coincident with the face of said chart, and means for supplying colored light to said narrow opening.

FREMONT H. BUCKINGHAM.